(12) United States Patent
Huang

(10) Patent No.: US 11,303,230 B2
(45) Date of Patent: Apr. 12, 2022

(54) FAN BRAKE CIRCUIT

(71) Applicant: ASIA VITAL COMPONENTS (SHEN ZHEN) CO., LTD., Shenzhen (CN)

(72) Inventor: Po-Sheng Huang, Shenzhen (CN)

(73) Assignee: ASIA VITAL COMPONENTS (SHEN ZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/002,796

(22) Filed: Aug. 26, 2020

(65) Prior Publication Data
US 2022/0069743 A1    Mar. 3, 2022

(51) Int. Cl.
*H02P 3/10* (2006.01)
*F04D 19/00* (2006.01)
*F04D 27/00* (2006.01)

(52) U.S. Cl.
CPC ............. *H02P 3/10* (2013.01); *F04D 19/002* (2013.01); *F04D 27/004* (2013.01)

(58) Field of Classification Search
CPC ......... H02P 3/10; F04D 19/002; F04D 27/004
See application file for complete search history.

(56) References Cited

U.S. PATENT DOCUMENTS

| | | | |
|---|---|---|---|
| 9,998,038 B1 | 6/2018 | Zhang et al. | |
| 2009/0315491 A1* | 12/2009 | Karwath | H02P 6/26 318/379 |
| 2011/0187299 A1 | 8/2011 | Horng et al. | |
| 2015/0188459 A1* | 7/2015 | Tseug | H02P 3/22 318/365 |
| 2018/0231074 A1* | 8/2018 | Sun | F04D 25/0613 |

FOREIGN PATENT DOCUMENTS

| | | |
|---|---|---|
| CN | 203166810 U | 8/2013 |
| TW | 200723666 A | 6/2007 |
| TW | 201525295 A | 7/2015 |

OTHER PUBLICATIONS

Search Report dated Oct. 7, 2021 issued by Taiwan Intellectual Property Office for counterpart application No. 109124617.

* cited by examiner

*Primary Examiner* — Zoheb S Imtiaz
(74) *Attorney, Agent, or Firm* — Demian K. Jackson; Jackson IPG PLLC

(57) ABSTRACT

A fan brake circuit includes a semiconductor switch unit, a motor, a motor drive circuit, an isolation unit, a charging/discharging unit and a control unit. One end of the motor, the semiconductor switch unit and the control unit serves to receive an input power. When the fan is powered off, the semiconductor switch unit disconnects from the motor and the motor drive circuit receives the operation voltage provided by the charging/discharging unit and transmits the drive signal to the motor, whereby the motor forms a short-circuit to brake. By means of the design of the fan brake circuit, when the fan is powered off, the fan can quickly brake and stop and the cost is lowered.

10 Claims, 8 Drawing Sheets

FAN BRAKE CIRCUIT

BACKGROUND OF THE INVENTION

1. Field of the Invention

The present invention relates generally to a fan brake circuit, and more particularly to a fan brake circuit, which can make the fan quickly brake and stop when the fan is powered off. The cost for the fan brake circuit is lowered.

2. Description of the Related Art

Please refer to FIG. 1A. A conventional fan power-cut brake circuit 1 mainly employs a capacitor 11 (often aluminum electrolytic capacitor) electrically connected with an input power Vin. The capacitor 11 serves to receive and store the input power Vin. When the fan is powered off, the capacitor 11 releases the stored voltage and directly supplies the voltage to an upper bridge (upper arm) MOS transistor 121 in the motor 12 to switch on the transistor and form short-circuit of the motor winding 122, whereby the fan motor can brake and stop. In the braking process, a counter-electromotive force is produced to backward charge the capacitor 11. Therefore, the kinetic energy is converted into electrical energy to further provide braking effect until one of the fan blade rotational kinetic energy and the stored voltage is first exhausted. In case the rotational kinetic energy is first exhausted, this means the fan blades first brake and stop. Reversely, in the stored voltage is first exhausted, the fan blades will continuously rotate until the inertial force disappears (further consumed by the frictional force).

The main object of the fan power-cut brake circuit is to quickly and fully brake and stop the fan blades so as to prevent an operator from mis-touching the fan blades to cause security problem. However, in the existing original design, the capacitor 11 is always the one that is first exhausted. Therefore, after the fan is powered off, the fan can hardly quickly (or abruptly) brake and stop. FIG. 1B is a waveform diagram of the actually measured input power Vin, the voltage of the capacitor 11, the voltage of the motor winding 122 and the fan current of the conventional fan power-cut brake circuit 1. In the drawing, the waveform symbol of the input power Vin is V. In the waveform V of the input power Vin, the arrow Vup means the up voltage (fan turned on) of the input power Vin, while the arrow Vdown means the down voltage (fan turned off) of the input power Vin. The voltage waveform symbol of the capacitor 11 is C. In the voltage waveform C of the capacitor 251, the arrow Cv means that after the fan is powered off, the stored voltage released from the capacitor 11 is very quickly exhausted by the motor winding 122 and lower than the switch-on voltage of the upper arm MOS transistor switch 121 so that the fan can hardly effectively quickly brake and stop. The voltage waveform symbol of the motor winding is M. In the voltage waveform M of the motor winding, the phantom frame area Moff presents downward inclined line, which means that the fan motor is still in operation, (that is, the fan blades are still in rotation) and counter-electromotive force voltage is still produced. The fan current waveform symbol is F. Therefore, according to the result of the above actually measured waveforms, it is revealed that the conventional capacitor 11 can only make the fan motor 12 shortly brake and then the braking function is lost. Therefore, the fan blades will still rotate until the inertial force of the fan blades themselves disappears and then the fan blades will be fully in a still state. Moreover, in the rotation process of the fan blades before the inertial force of the fan blades themselves disappears, the counter-electromotive force problem will be caused. In order to improve this, currently, the manufacturers generally enlarge the specification and size of the capacitor 11 to increase the capacitance. However, the design space of the fan is often limited. Therefore, it is hard to selectively employ a capacitor 11 with larger size or larger capacitance in a limited space for achieving quick brake and stop effect for the fan. Also, it is hard for the conventional fan power-cut brake circuit 1 to use multiple parallel capacitors 11 in the limited space to quickly brake and stop the fan. The above factors will lead to increase of the total cost and make it impossible to miniaturize the total volume of the fan. Therefore, the improvement effect of the conventional fan power-cut brake circuit 1 is poor.

SUMMARY OF THE INVENTION

It is therefore a primary object of the present invention to provide a fan brake circuit, which can make the fan quickly brake and stop when the fan is powered off. Also, the cost for the fan brake circuit is lowered.

It is a further object of the present invention to provide a miniaturized fan brake circuit.

To achieve the above and other objects, the fan brake circuit includes a semiconductor switch unit, a motor, a motor drive circuit, an isolation unit, a charging/discharging unit and a control unit. The semiconductor switch unit has a first end and a second end. The first end serves to receive an input power. The motor is electrically connected with the input power and the first end. The motor drive circuit is electrically connected with the motor for outputting a drive signal to the motor. The isolation unit is electrically connected between the semiconductor switch unit and the motor drive circuit. The isolation unit has multiple resistors respectively electrically connected with the motor drive circuit and the second. The charging/discharging unit is electrically connected with the multiple resistors for receiving and storing an operation voltage. The control unit is electrically connected with the input power and the motor drive circuit and the motor for outputting multiple control signals to respectively control the motor drive circuit and the motor. When the fan is powered off, the semiconductor switch unit disconnects the first end from the motor and the motor drive circuit receives the operation voltage provided by the charging/discharging unit to transmit the drive signal to the motor so that the motor forms a short-circuit and brakes. By means of the design of the fan brake circuit of the present invention, when the fan is powered off, the fan can quickly effectively brake and stop. Also, the fan brake circuit is miniaturized and the cost is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
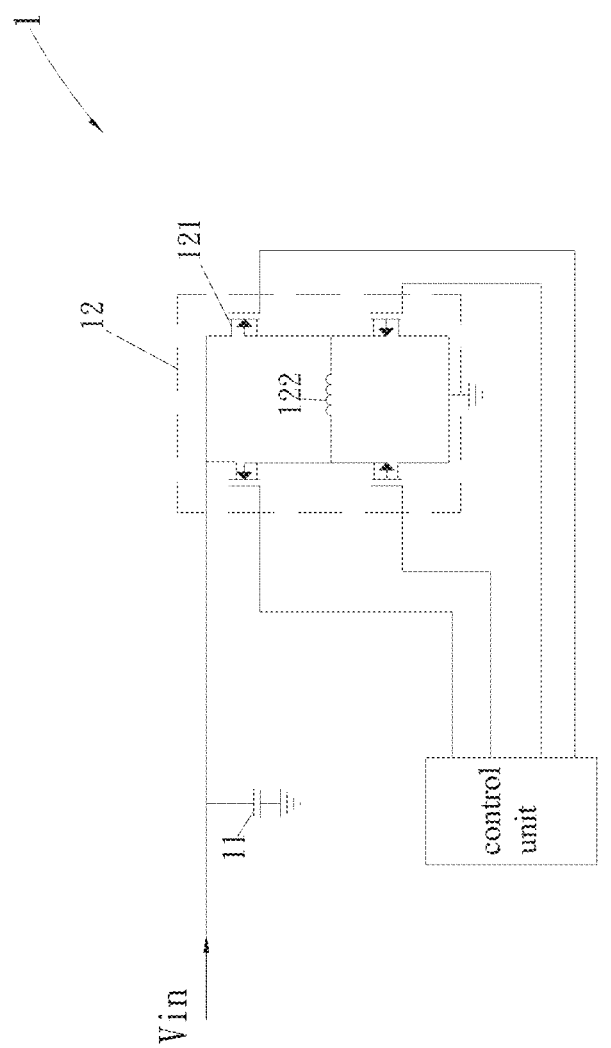
FIG. 1A is a block diagram of a conventional fan power-cut brake circuit.
Figure 1B:
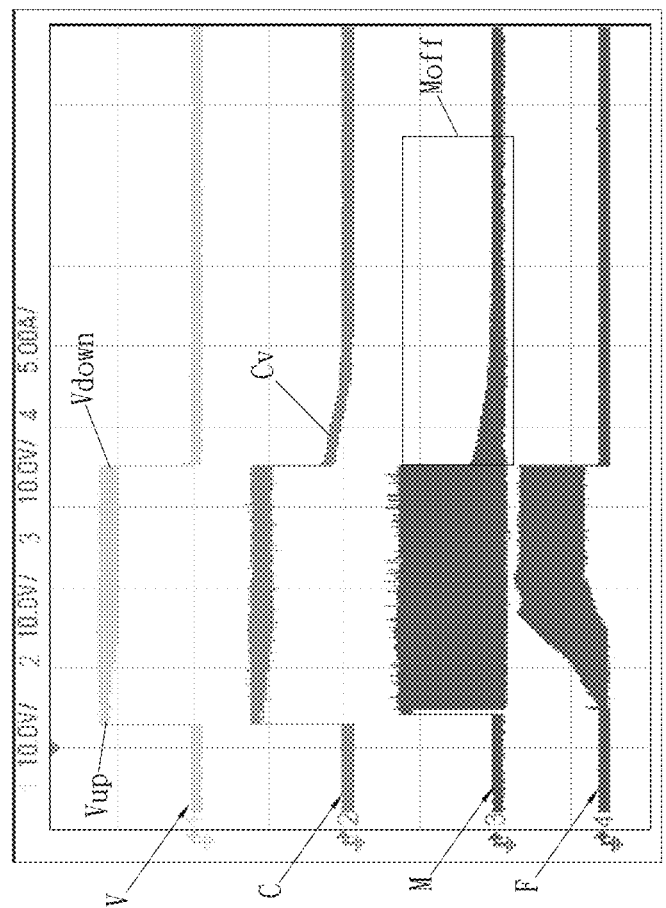
FIG. 1B is a waveform diagram of the actually measured input power, the voltage of the capacitor, the voltage of the motor winding and fan current of the conventional fan power-cut brake circuit.
Figure 2A:
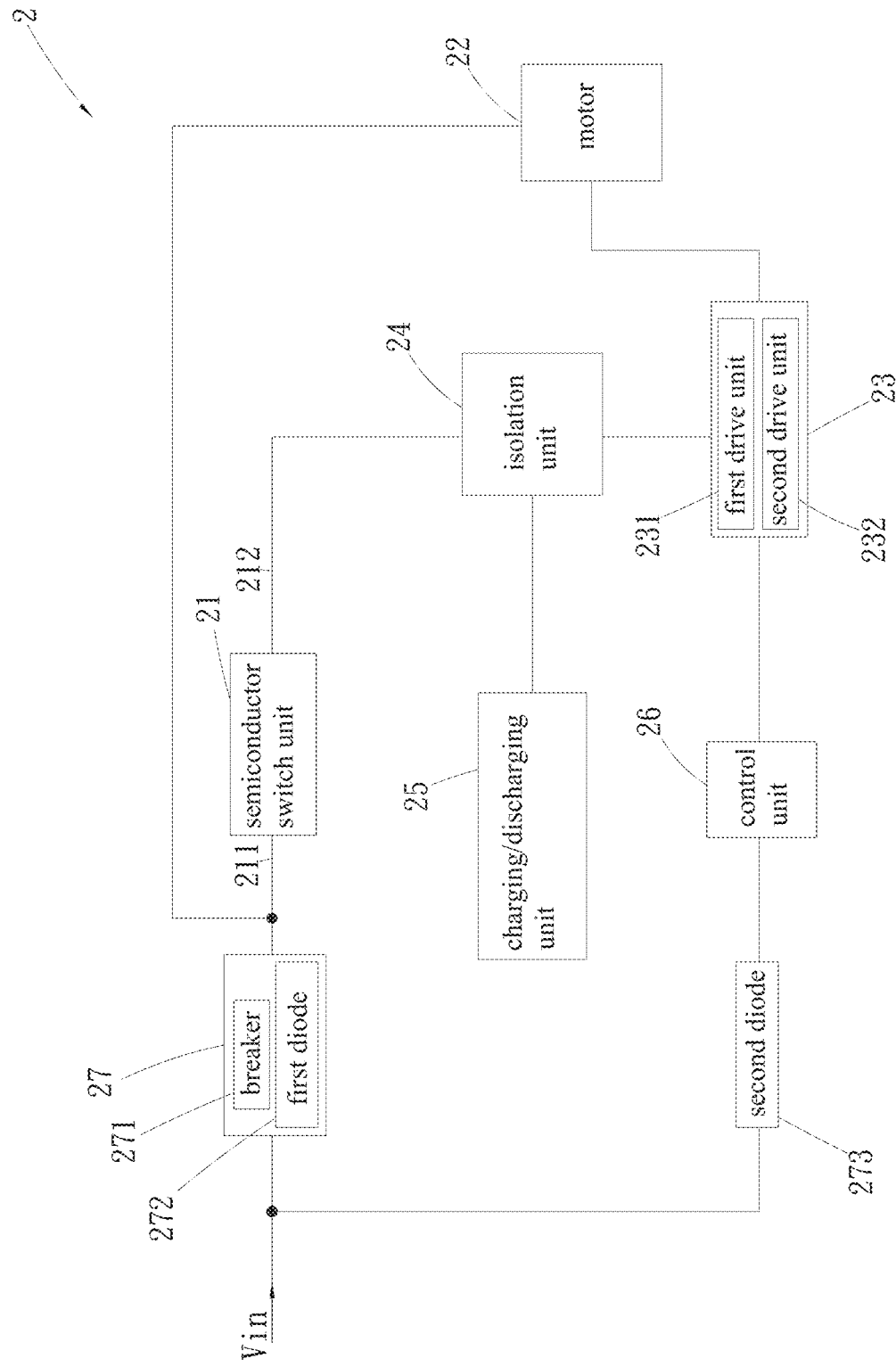
FIG. 2A is a block diagram of a preferred embodiment of the fan brake circuit of the present invention.
Figure 2B:
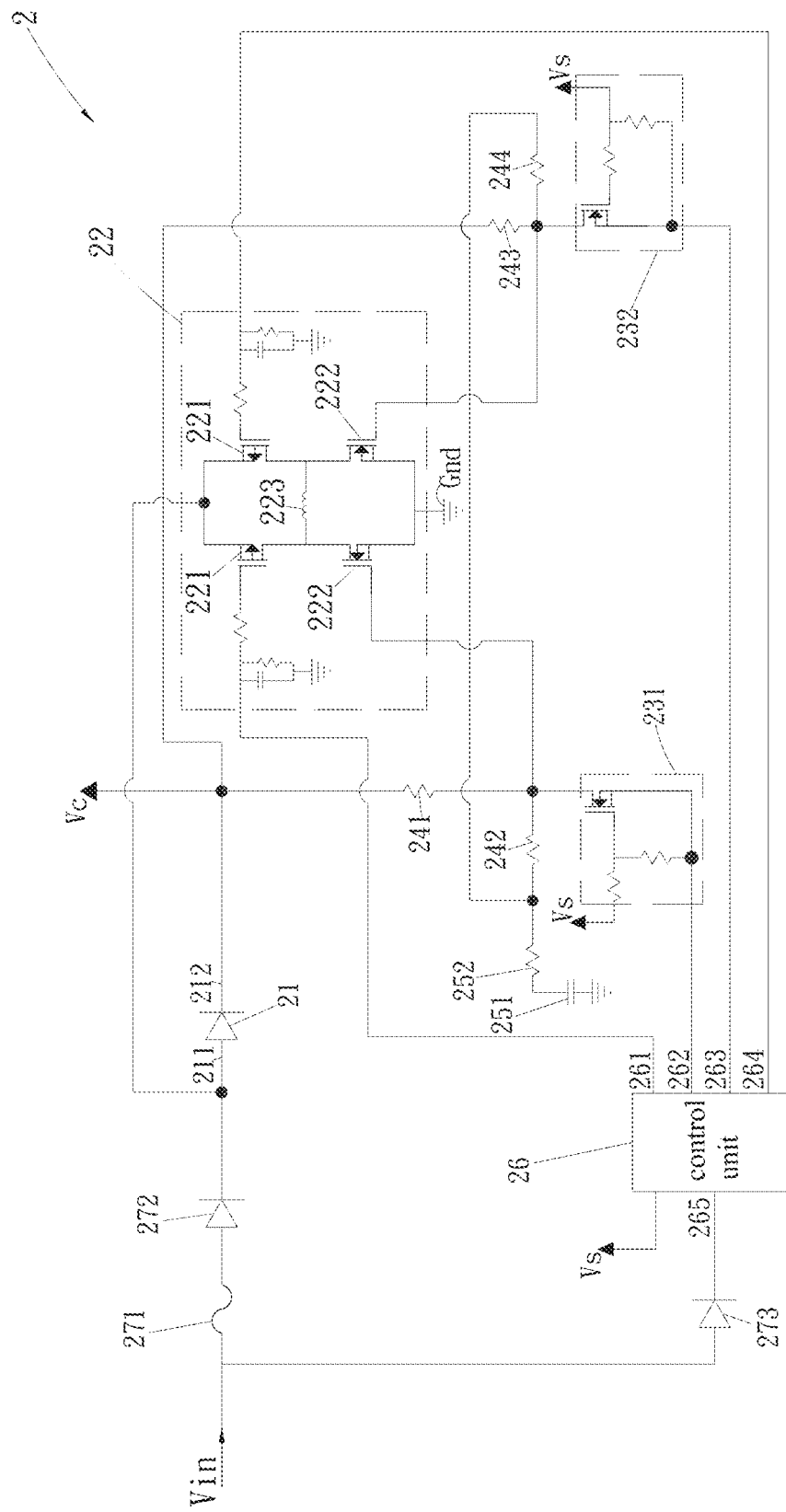
FIG. 2B is a circuit diagram of the fan brake circuit of the present invention according to FIG. 2A.
Figure 2C:
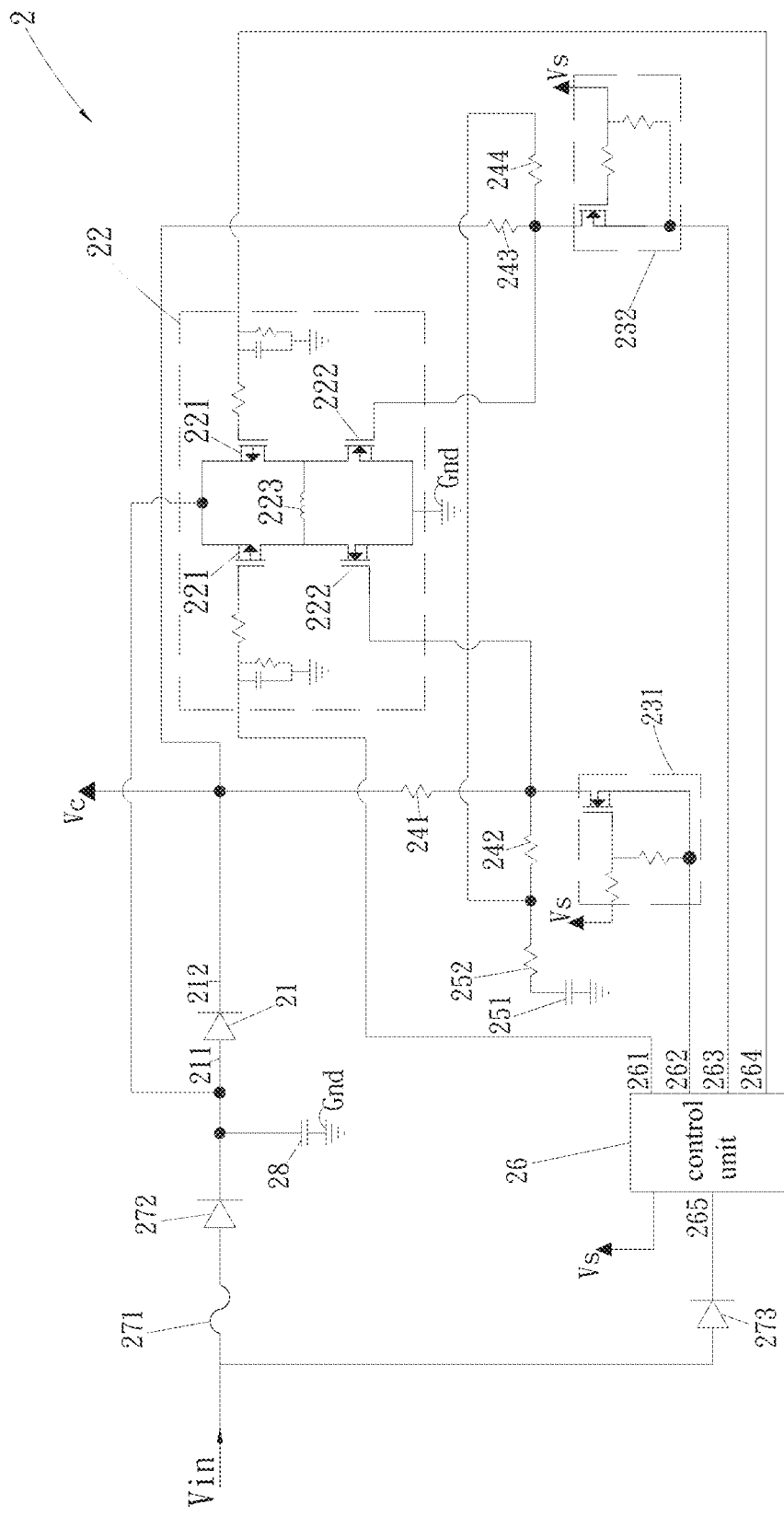
FIG. 2C is a circuit diagram of a preferred embodiment of the fan brake circuit of the present invention.
Figure 3A:
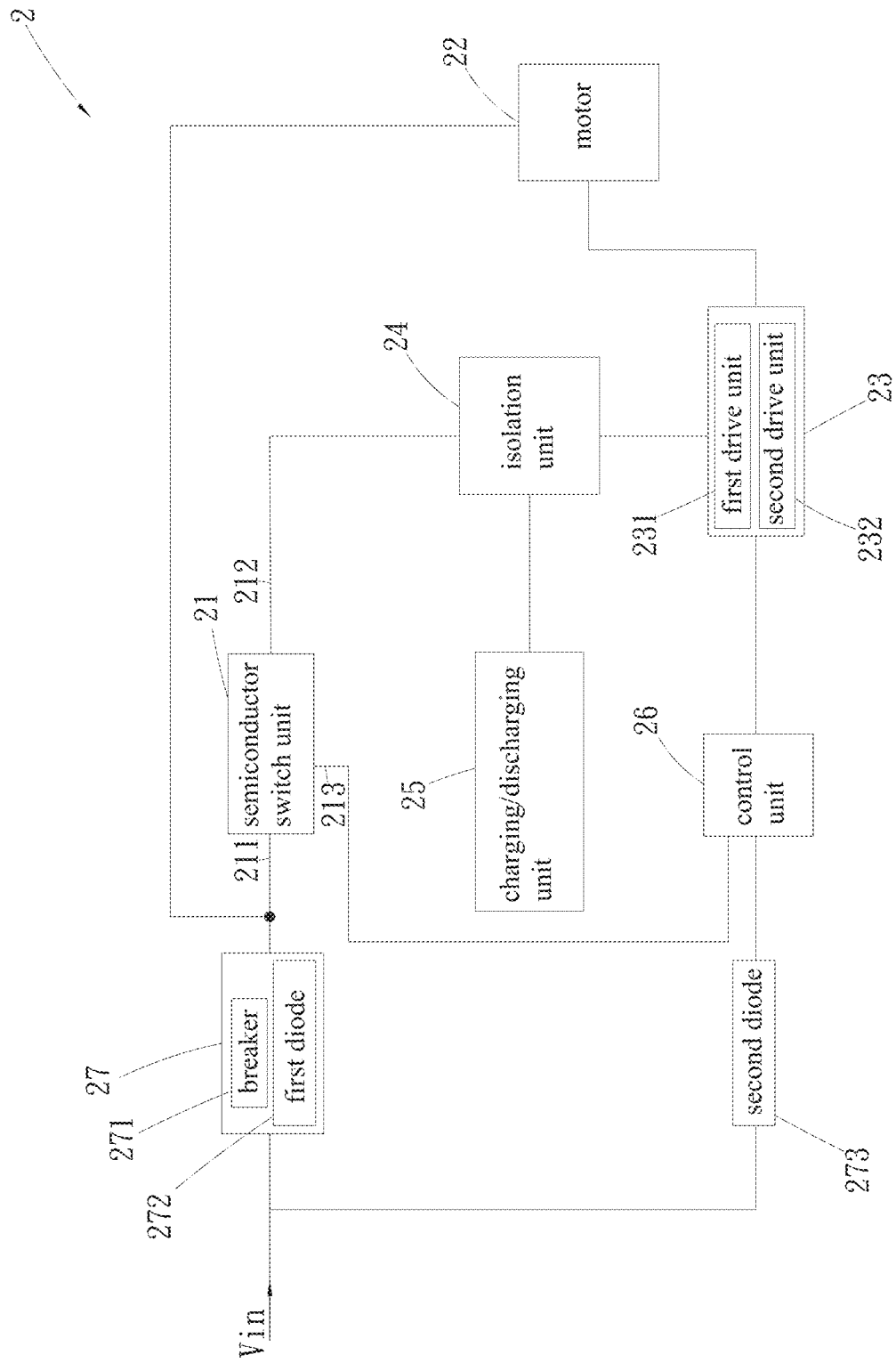
FIG. 3A is a block diagram of a modified embodiment of the fan brake circuit of the present invention.
Figure 3B:
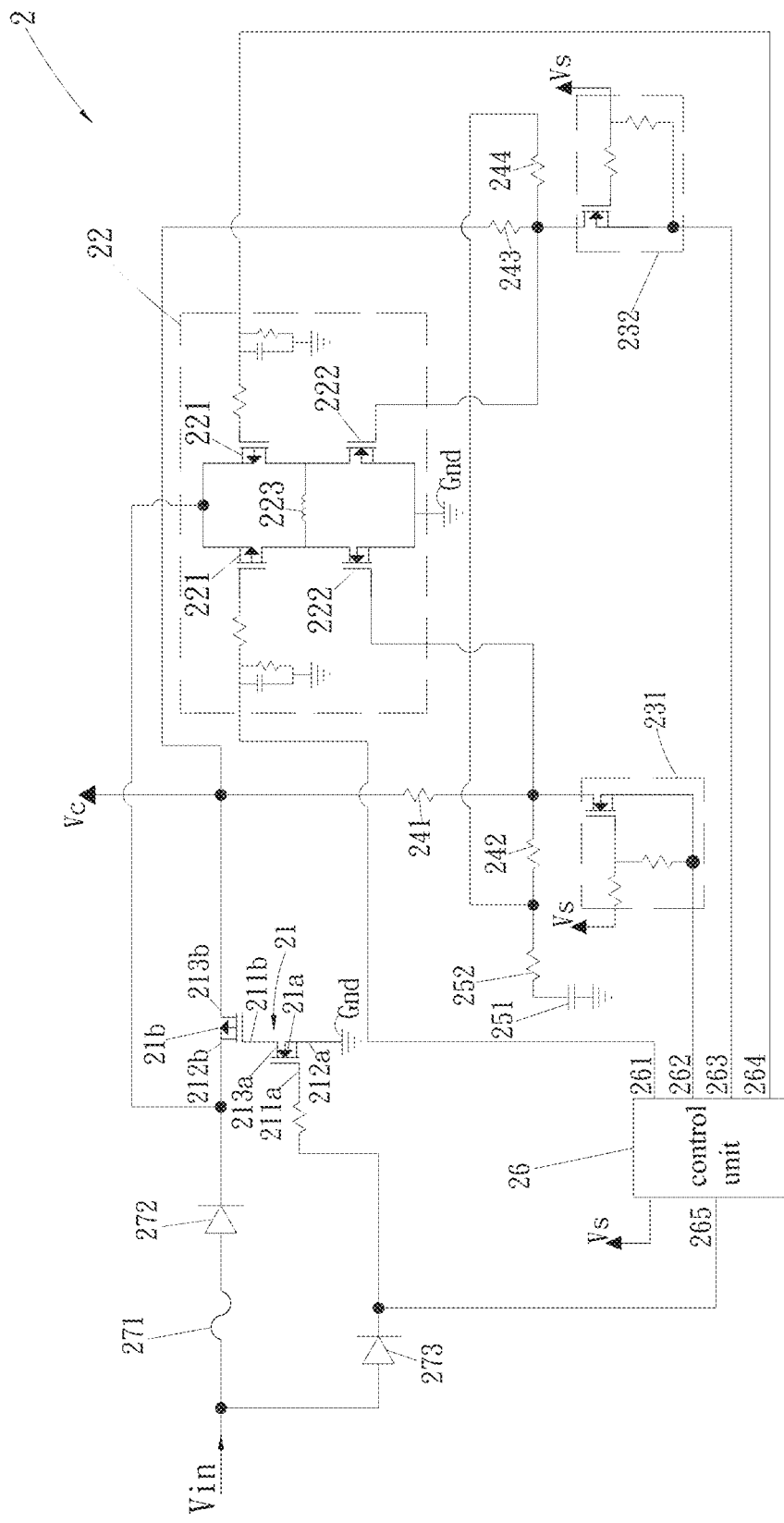
FIG. 3B is a circuit diagram of the fan brake circuit of the present invention according to FIG. 3A.
Figure 4:
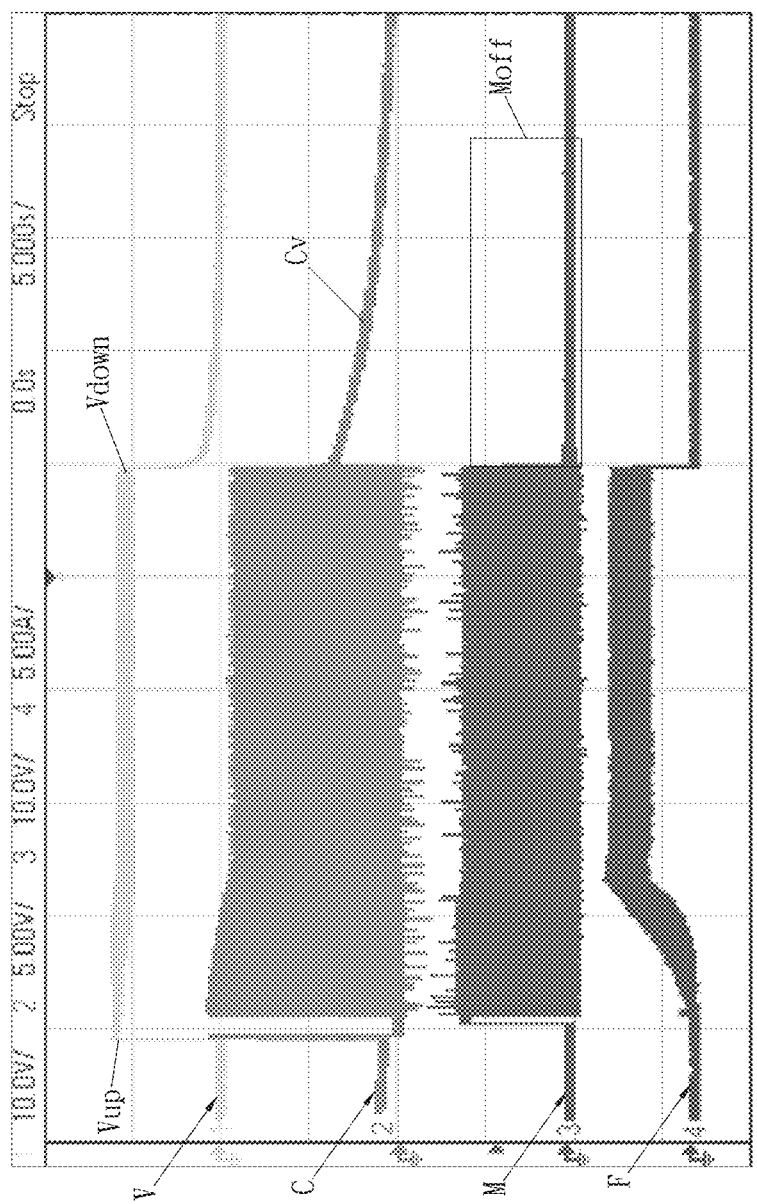
FIG. 4 is a waveform diagram of the actually measured input power, the voltage of the capacitor of the charging/discharging unit, the voltage of the motor winding and the fan current of a preferred embodiment of the fan brake circuit of the present invention.

Please refer to FIGS. 2A, 2B, 2C, 3A, 3B and 4. FIG. 2A is a block diagram of a preferred embodiment of the fan brake circuit of the present invention. FIG. 2B is a circuit diagram of the fan brake circuit of the present invention according to FIG. 2A. FIG. 2C is a circuit diagram of a preferred embodiment of the fan brake circuit of the present invention. FIG. 3A is a block diagram of a modified embodiment of the fan brake circuit of the present invention. FIG. 3B is a circuit diagram of the fan brake circuit of the present invention according to FIG. 3A. FIG. 4 is a waveform diagram of the actually measured input power, capacitor member voltage of a charging/discharging unit, motor winding voltage and fan current of a preferred embodiment of the fan brake circuit of the present invention. As shown in FIGS. 2A and 2B, the fan brake circuit 2 includes a semiconductor switch unit 21, a motor 22, a motor drive circuit 23, an isolation unit 24, a charging/discharging unit 25 and a control unit 26. In the embodiment as shown in FIG. 2B, the semiconductor switch unit 21 is selectively a diode for illustration purposes. The semiconductor switch unit 21 has a first end 211 and a second end 212. The first end 211 is an anode of the semiconductor switch unit 21 for receiving an input power Vin (such as input power Vin output from a power supply, which is 10 volts). The second end 212 is a cathode of the semiconductor switch unit 21. In addition, a protection unit 27 is electrically connected between the end 211 is an anode of the semiconductor switch unit 21 and the input power Vin. The protection unit 27 has a breaker 271 and a first diode 272.

The breaker 271 is such as a fuse. One end of the breaker 271 is electrically connected with the input power Vin. When the fan normally operates, the input power Vin can pass through the breaker 271. In case of abnormality of the fan (such as override or malfunction of the circuit), the breaker 271 will break the circuit to provide protection. An anode and a cathode of the first diode 272 are respectively electrically connected with the other end of the breaker 271 and the anode (the first end 211) of the semiconductor switch unit 21.

The motor 22 is electrically connected with the input power Vin and the first end 211 of the semiconductor switch unit 21. The motor 22 is such as a three-phase motor or a single-phase motor. In this embodiment, the motor 22 is a single-phase motor for illustration purposes. The motor 22 includes multiple upper arm switch members 221, multiple lower arm switch members 222 and a motor winding 223. In this embodiment, the multiple upper and lower arm switch members 221, 222 are, but not limited to, respectively two upper arm switch members 221 such as PMOS transistors and two lower arm switch members 222 such as NMOS transistors. The multiple upper arm switch members 221 are correspondingly connected with the multiple lower arm switch members 222. That is, the drains of the two upper arm switch members 221 are commonly electrically with the input power Vin and the anode (the first end 211) of the semiconductor switch unit 21. In addition, the drains of the two upper arm switch members 221 are the power supply ends of the motor. The sources of the two upper arm switch members 221 are respectively electrically with the drains of the two corresponding lower arm switch members 222. Also, the junction between the two upper arm switch members 221 and the two lower arm switch members 222 is connected to the motor winding 223. The sources of the two lower arm switch members 222 are electrically connected with a grounding end Gnd.

The motor drive circuit 23 is electrically connected with the motor 22 and the control unit 26. The motor drive circuit 23 serves to output a drive signal to the motor 22. The motor drive circuit 23 includes a first motor drive unit 231 and a second motor drive unit 232. In this embodiment, the first and second motor drive units 231, 232 respectively include multiple resistors and at least one transistor (such as NMOS transistor). In addition, the other ends of the first and second motor drive units 231, 232 are respectively electrically connected with the gates of the multiple lower arm switch members 222 of the motor 22. The first and second motor drive units 231, 232 respectively transmit drive signals to the multiple lower arm switch members 222 of the motor 22. In practice, the numbers of the motor drive units and the multiple upper and lower arm switch members 221, 222 are adjustable in accordance with the number of the phases of the motor 22. For example, in the case that the motor 22 is a three-phase motor, the number of the motor drive units is adjusted to be three in cooperation with three upper arm switch members 221 and three lower arm switch members 222, and so on.

The isolation unit 24 is electrically connected between the semiconductor switch unit 21 and the motor drive circuit 23. The isolation unit 24 has multiple resistors respectively electrically connected with the motor drive circuit 23 and the second end 212. In this embodiment, there are four resistors. That is, the multiple resistors are a first resistor 241, a second resistor 242, a third resistor 243 and a fourth resistor 244. One end of the first and second resistors 241, 242 is electrically correspondingly connected with the other end of the first motor drive unit 231 and the gate of the first lower arm switch member 222 of the motor 22. One end of the third and fourth resistors 243, 244 is electrically correspondingly connected with the other end of the second motor drive unit 232 and the gate of the second lower arm switch member 222 of the motor 22. The other ends of the first and third resistors 241, 243 are electrically connected with the second end 212 of the semiconductor switch unit 21 and an operation voltage Vc (such as 5 volts). The other ends of the second and fourth resistors 242, 244 are electrically connected with each other. Therefore, the multiple resistors, (that is, the first, second, third and fourth resistors 241, 242, 243, 244) serve to segment the drive signals for normally driving the fan motor 22 (single-phase motor or three-phase motor). In practice, the number of the resistors is in accordance with the number of the motor drive units. For example, three motor drive units cooperate with three sets of resistors. Each set of resistors is composed of such as two or more than two resistors.

The charging/discharging unit 25 is electrically connected with the multiple resistors of the isolation unit 24 for receiving and storing the operation voltage Vc. The charging/discharging unit 25 includes a capacitor 251 and a charging/discharging resistor 252. One end of the charging/discharging resistor 252 is respectively electrically connected with the other end of the second resistor 242 and the other end of the fourth resistor 244. The other end of the charging/discharging resistor 252 is electrically connected with one end of the capacitor 251. The other end of the capacitor 251 is electrically connected with the grounding end Gnd. In addition, the first and second motor drive units 231, 232 serve to receive the high-voltage operation voltage Vc released from the charging/discharging unit 25 so as to transmit the respective drive signals to the multiple lower arm switch members 222 and switch on the same.

Therefore, by means of adjusting the capacitance of the capacitor 251 in the charging/discharging unit 25 in accordance with the resistance of the charging/discharging resistor 252, the potential charging/discharging time can be controlled and adjusted so as to further control the switch-on time of the multiple lower arm switch members 222 and the braking time of the fan. Therefore, the adjustment can be flexibly achieved.

Moreover, after power-cut of the fan, the semiconductor switch unit 21 prevents the voltage (potential) of the capacitor 251 of the charging/discharging unit 25 from being released from the connection path between the first end 211 and the motor power supply end. Therefore, the voltage of the capacitor 251 of the charging/discharging unit 25 can be lastingly continuously provided for the first and second motor drive units 231, 232. Therefore, the first and second motor drive units 231, 232 can respectively transmit the drive signals to drive and switch on the multiple correspondingly lower arm switch members 222 so as to form a short-circuit between two ends of the motor winding 223, whereby the fan motor 22 can quickly brake to fully stop. Further referring to FIG. 4, which is a waveform diagram of the actually measured input power Vin, the voltage of the capacitor 251 of the charging/discharging unit 25, the voltage of the motor winding 223 and the fan current of a preferred embodiment of the fan brake circuit of the present invention. In the drawing, the waveform symbol of the input power Vin is V. In the waveform V of the input power Vin, the arrow Vup means the up voltage (fan turned on) of the input power Vin, while the arrow Vdown means the down voltage (fan turned off) of the input power Vin. The voltage waveform symbol of the capacitor 251 is C. In the voltage waveform C of the capacitor 251, the arrow Cv means that after the fan is powered off, the stored operation voltage Vc released from the capacitor 251 can keep above the switch-on voltage of the multiple lower arm switch members 222 and the switch-on time of the lower arm switch members 222 is longer. The voltage waveform symbol of the motor winding 223 is M. In the voltage waveform M of the motor winding 223, the phantom frame area Moff presents horizontal smooth line, which means that the fan motor has quickly braked to stop, (that is, the fan blades have abruptly stopped in a completely still state) and there is no counter-electromotive force voltage. The fan current waveform symbol is F. Therefore, according to the result of the above actually measured waveforms, it is revealed that the present invention can truly achieve quick brake and stop effect for the fan. In a preferred embodiment, the charging/discharging unit 25 includes multiple capacitors 251 and multiple charging/discharging resistors 252.

The control unit 26 is a central processing unit (CPU) or a microcontroller unit (MCU) or a digital signal processor (DSP). The control unit 26 is connected with the input power Vin and the motor 22 for outputting multiple control signals (such as PWM signals) to respectively control the motor drive circuit 23 and the motor 22. In this embodiment, a second diode 273 is disposed between the control unit 26 and the input power Vin. An anode of the second diode 273 is electrically connected with the input power Vin, while a cathode of the second diode 273 is electrically connected with the control unit 26. The control unit 26 has multiple contact pins, wherein a first contact pin 261 and a fourth contact pin 264 are electrically connected with the gates of the multiple upper arm switch members 221 of the motor 22. A second contact pin 262 and a third contact pin 263 are electrically connected with one end of the first and second motor drive units 231, 232. A fifth contact pin 265 is electrically connected with the cathode of the second diode 273. In addition, the four contact pins, (that is, the first, second, third and fourth contact pins 261, 262, 263, 264) of the control unit 26 respectively output control signals (pulse width modulation, PWM signals) to control the switching operation (such as switch-on or switch-off) of the multiple upper arm switch members 221 and control the first and second motor drive units 231, 232 to respectively drive and the switching operation (such as switch-on or switch-off) of the multiple lower arm switch members 221 so as to make the fan motor 22 operate.

Therefore, when the fan is powered off, the semiconductor switch unit 21 will disconnect the first end 211 from the motor 22, (that is, disconnect the first end 211 from the motor power supply end). Also, the semiconductor switch unit 21 will prevent the voltage (potential) of the capacitor 251 of the charging/discharging unit 25 at the rear end from being counter-consumed. At this time, the charging/discharging unit 25 will release the stored operation voltage Vc to the first and second motor drive units 231, 232, whereby the first and second motor drive units 231, 232 drive the corresponding first and second lower arm switch members 222 to keep switched off and form the short-circuit between two ends of the motor winding 223 so that the motor 22 can quickly brake and stop.

Referring to FIG. 2C, in a preferred embodiment, a capacitor 28 is disposed between the first diode 272 and the semiconductor switch unit 21. One end of the capacitor 28 is electrically connected with the cathode of the first diode 272 and the anode of the semiconductor switch unit 21 and the power supply end of the motor 22. The capacitor 28 serves to receive and store the input power Vin. When the fan is powered off, the capacitor 28 provides the input power Vin to the multiple upper arm switch members 221 to switch on the same, whereby the multiple upper arm switch members 221 and the motor winding 223 are short-circuited to brake. The motor winding 223 will quickly consume the input power Vin provided by the capacitor 28 to make the multiple upper arm switch members 221 switched off. Also, the charging/discharging unit 25 will provide the operation voltage Vc to the first and second motor drive units 231, 232 to drive the multiple lower arm switch members 222 to keep switched on (turned on) so as to keep the motor winding 223 short-circuited, whereby the fan can quickly brake and stop to achieve double-brake effect.

Referring to FIGS. 3A and 3B, in a modified embodiment, the semiconductor switch unit 21 is a semiconductor transistor. The semiconductor transistor is a field-effect transistor (such as MOS transistor) or an insulated gate bipolar transistor (IGBT). In this embodiment, the semiconductor switch unit 21 is, but not limited to, an MOS transistor with switching function, wherein when the fan is powered off, the first end 211 of the semiconductor switch unit 21 is disconnected from the power supply end of the motor for illustration purposes. The semiconductor switch unit 21 of the present invention can be any semiconductor transistor, wherein when the fan is powered off, the first end of the semiconductor transistor is disconnected from the power supply end of the motor. The semiconductor switch unit 21 has at least one semiconductor switch member. In this modified embodiment, the semiconductor switch unit 21 is composed of two semiconductor switch members for illustration purposes. That is, the semiconductor switch unit has a first semiconductor switch member 21a and a second semiconductor switch member 21b. In this embodiment, the first and second semiconductor switch members 21a, 21b are respectively an N-type MOS transistor and a P-type MOS transistor. Each of the first and second semiconductor switch members 21a, 21b has a first pole 211a, 211b, a second pole 212a, 212b and a third pole 213a, 213b. The first pole 211a of the first semiconductor switch member 21a, (that is, the third end 213 of the semiconductor switch unit 21) is a gate electrically connected with the control unit 26 and the input power Vin. The third pole 213a of the first semiconductor switch member 21a is a drain electrically connected with the first pole 211b of the second semiconductor switch member 21b, which is a gate. The second pole 212a of the first semiconductor switch member 21a is a source electrically connected with the grounding end Gnd. The second pole 212b of the second semiconductor switch member 21b, (that is, the first end 211 of the semiconductor switch unit 21) is a source electrically connected with the input power Vin and the motor power supply end. The third pole 213b of the second semiconductor switch member 21b, (that is, the second end 212 of the semiconductor switch unit 21) is a drain electrically connected with the other ends of the first and third resistors 241, 243. When the fan is powered off, the voltage of the first pole 211a (the gate) of the first semiconductor switch member 21a is smaller than the voltage of the second pole 212a (the source) and the circuit is opened (switched off). The voltage of the first pole 211b (the gate) of the second semiconductor switch member 21b is greater than the voltage of the second pole 212b (the source). In addition, the resistance from the second pole 212b to the third pole 213b is so great that the second semiconductor switch member 21b is opened (switched off). Therefore, after the fan is powered off, by means of the first and second semiconductor switch members 21a, 21b of the present invention, the voltage (potential) of the capacitor 251 of the charging/discharging unit 25 will not be released from the path between the first end 211 and the motor power supply end.

Accordingly, by means of the design of the fan brake circuit 2 of the present invention, when the fan is powered off, the fan can quickly effectively brake and stop and the cost is lowered. In addition, it is unnecessary for the charging/discharging unit 25 to selectively employ a capacitor with large capacitance and it is unnecessary to continuously enlarge the capacitance. Therefore, the capacitor 251 of the charging/discharging unit 25 of the present invention can be, but not limited to, a small-size capacitor (such as 0402, 0603, 0805 small-size ceramic chip capacitor). In this case, the capacitor can be easily mounted on the circuit board (PCB) of the fan without space limitation. Also, in the limited space of the circuit board, more space can be reserved for arrangement of other electronic components (such as IC chip, heat dissipation component or transistor). Therefore, the fan brake circuit 2 can be effectively miniaturized. Moreover, the entire fan of the present invention can be miniaturized along with the miniaturization of the capacitor.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A fan brake circuit comprising:
   a semiconductor switch unit having a first end and a second end, the first end serving to receive an input power;
   a motor electrically connected with the input power and the first end;
   a motor drive circuit electrically connected with the motor for outputting a drive signal to the motor;
   an isolation unit electrically connected between the semiconductor switch unit and the motor drive circuit, the isolation unit having multiple resistors respectively electrically connected with the motor drive circuit and the second;
   a charging/discharging unit electrically connected with the multiple resistors for receiving and storing an operation voltage; and
   a control unit electrically connected with the input power and the motor drive circuit and the motor for outputting multiple control signals to respectively control the motor drive circuit and the motor, whereby when the fan is powered off, the semiconductor switch unit disconnects the first end from the motor and the motor drive circuit receives the operation voltage provided by the charging/discharging unit to transmit the drive signal to the motor so that the motor forms a short-circuit and brakes.

2. The fan brake circuit as claimed in claim 1, wherein the multiple resistors are a first resistor, a second resistor, a third resistor and a fourth resistor, one end of the first, second, third and fourth resistors being electrically connected with the corresponding motor drive circuit, the other ends of the first and third resistors being electrically connected with the second end of the semiconductor switch unit, the other ends of the second and fourth resistors being electrically connected with each other.

3. The fan brake circuit as claimed in claim 2, wherein the charging/discharging unit includes a capacitor and a charging/discharging resistor, one end of the charging/discharging resistor being respectively electrically connected with the other end of the second resistor and one end of the capacitor, the other end of the capacitor being electrically connected with the grounding end.

4. The fan brake circuit as claimed in claim 3, wherein the semiconductor switch unit is a diode, an anode of the semiconductor switch unit being the first end, a cathode of the semiconductor switch unit being the second end.

5. The fan brake circuit as claimed in claim 3, wherein the semiconductor switch unit has a third end, a first semiconductor switch member and a second semiconductor switch member, each of the first and second semiconductor switch members having a first pole, a second pole and a third pole, the first pole of the first semiconductor switch member being the third end of the semiconductor switch unit, which is electrically connected with the control unit and the input power, the third pole of the first semiconductor switch member being electrically connected with the first pole of the second semiconductor switch member, the second poles of the first and second semiconductor switch members being respectively electrically connected with the grounding end and the input power, the second pole of the second first semiconductor switch member being the first end of the semiconductor switch unit, the second end of the semiconductor switch unit being the third pole of the second semiconductor switch member, which is electrically connected with the other ends of the first and third resistors.

6. The fan brake circuit as claimed in claim 5, wherein the first and second semiconductor switch members are respectively an N-type MOS transistor and a P-type MOS transistor, the first poles of the first and second semiconductor switch members being gates, the second poles of the first and second semiconductor switch members being sources, the third poles of the first and second semiconductor switch members being drains.

7. The fan brake circuit as claimed in claim 5, wherein the first and second semiconductor switch members are semiconductor transistors, the semiconductor transistors being field-effect transistors or insulated gate bipolar transistors (IGBT).

8. The fan brake circuit as claimed in claim 2, wherein the control unit has multiple contact pins and the motor drive circuit includes a first motor drive unit and a second motor drive unit, one end of the first and second motor drive units being respectively electrically connected with a second contact pin and a third contact pin of the multiple contact pins, the other end of the first motor drive unit being respectively electrically connected with one end of the first and second resistors and the motor, the other end of the second motor drive unit being respectively electrically connected with one end of the third and fourth resistors and the motor, a first contact pin and a fourth contact pin of the multiple contact pins being respectively electrically connected to the motor.

9. The fan brake circuit as claimed in claim 8, wherein the motor has multiple upper arm switch members, multiple lower arm switch members and a motor winding, the multiple upper arm switch members being correspondingly connected with the multiple lower arm switch members, a junction between the multiple upper arm switch members and the multiple lower arm switch members being connected to the motor winding, the other end of the first motor drive unit being electrically connected with the one of the multiple lower arm switch members, the other end of the second motor drive unit being electrically connected with another of the multiple lower arm switch members.

10. The fan brake circuit as claimed in claim 1, wherein the control unit is a central processing unit or a microcontroller unit or a digital signal processor.

* * * * *